Aug. 5, 1941.　　　　J. A. LEWIS　　　　2,251,847
GLASS MACHINE
Filed Nov. 5, 1938　　　2 Sheets-Sheet 1
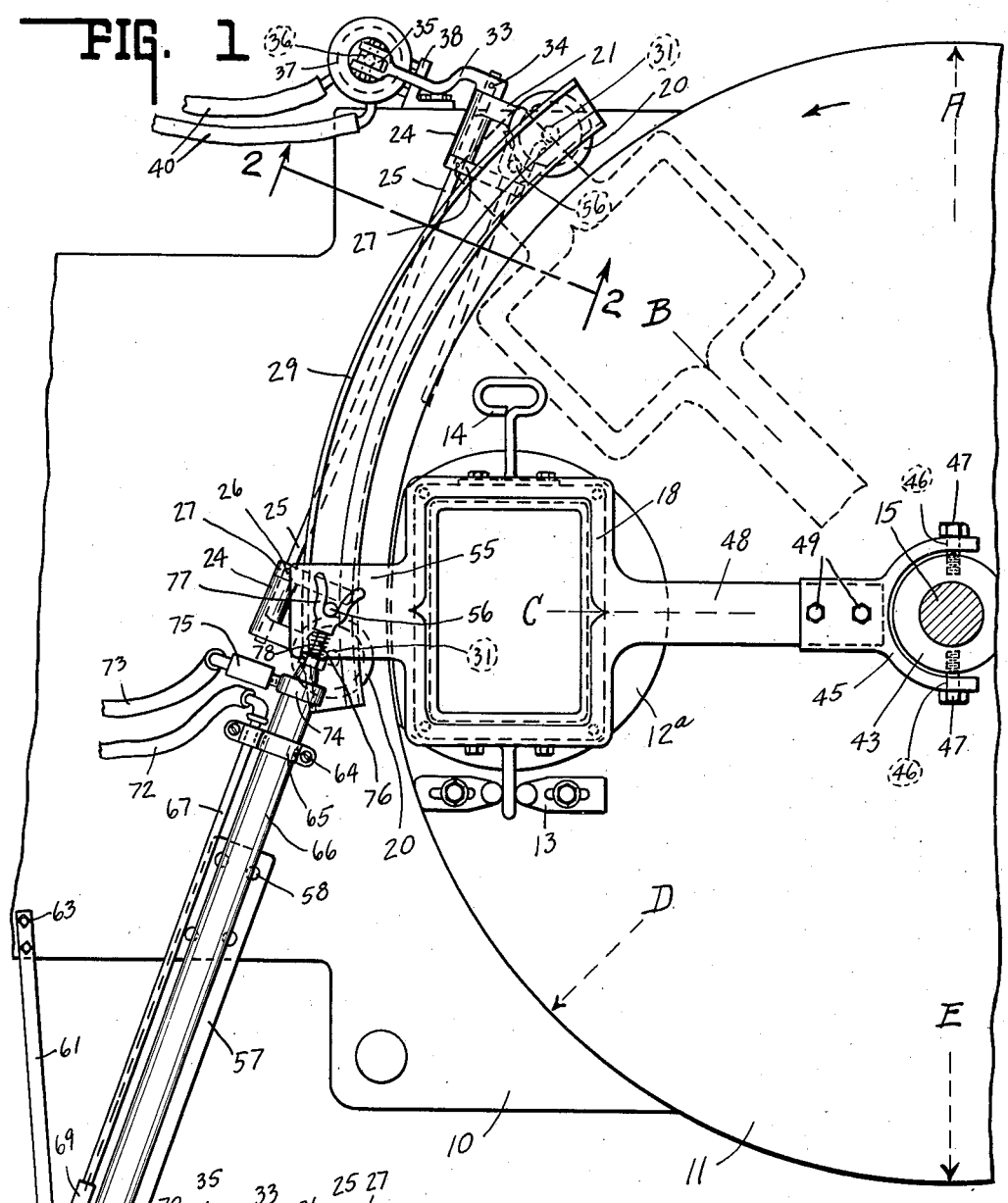
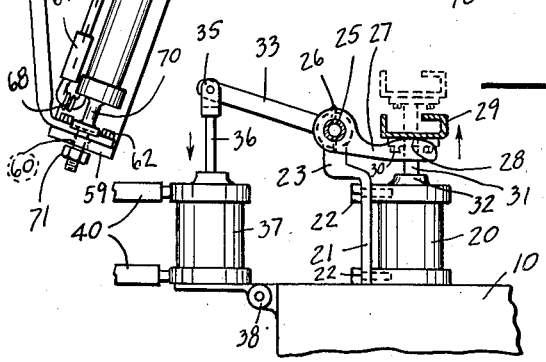
INVENTOR.
JAMES A. LEWIS.
BY Lockwood, Goldsmith & Galt,
ATTORNEYS.

Aug. 5, 1941.  J. A. LEWIS  2,251,847
GLASS MACHINE
Filed Nov. 5, 1938  2 Sheets-Sheet 2

INVENTOR.
JAMES A. LEWIS.
BY Lockwood, Goldsmith + Galt,
ATTORNEYS.

Patented Aug. 5, 1941

2,251,847

UNITED STATES PATENT OFFICE 2,251,847

GLASS MACHINE

James A. Lewis, Hartford City, Ind., assignor to Sneath Glass Company, Hartford City, Ind., a corporation Application November 5, 1938, Serial No. 239,041

7 Claims. (Cl. 49—37)

This invention relates to apparatus for insuring the perfect formation of a predetermined rim arrangement upon a glass article.

One chief object of this invention is to provide means whereby following the initial formation of the glass article, there is retained in association with the rim a mold portion so that any variation in the rim or tendency thereof to collapse is eliminated.

The chief feature of the invention consists in the provision of means applied to a standard glass pressing machine for accomplishing the foregoing object.

Other objects and features will be set forth more fully hereinafter.

The full nature of the invention will be understood from the accompanying drawings and the following description and claims:

In the drawings, Fig. 1 is a top plan view of a portion of a glass pressing machine, the rim forming mold being shown in the position corresponding to that assumed when disassociated from the glass article, the dotted lines indicating the position of the same when it is initially associated with main mold and plunger for the formation of the article.

Fig. 2 is a sectional view taken on line 2—2 of Fig. 1 and in the direction of the arrows, the full lines representing the position of the elevator when the rim mold is in registration with the molded article, the dotted lines indicating the position of the support mechanism when the rim mold is in registration with the article nesting mold but not associated therewith.

Figure 3:
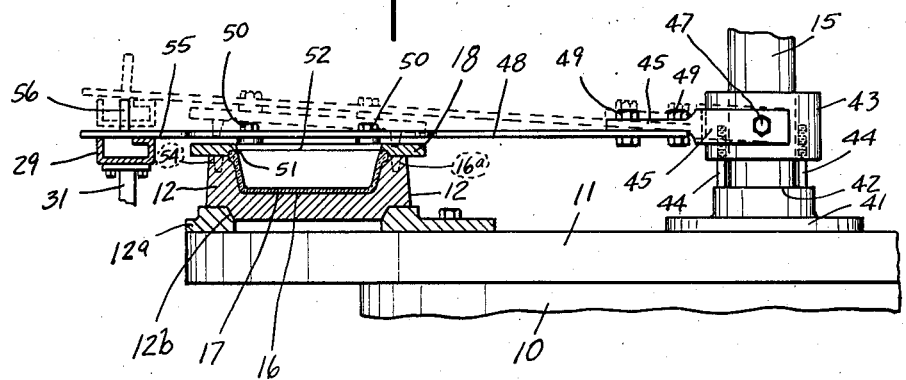
Fig. 3 is an elevational view of a portion of the glass article forming machine, the main or article nesting mold, the article therein, and the rim mold, the elevating mechanism therefor being shown in vertical section, and other mechanism associated therewith being shown in elevation.

In the drawings 10 indicates the bed of a machine, 11 indicates the rotating table rotatably supported thereby and adapted to detachably receive certain main molds 12 detachably mounted as at 13 and each provided with the handle portion 14. Rising from the bed of the machine is a central column or standard 15 which is stationary.

As shown in Fig. 3, the main mold 12 is of rectangular well type with outwardly tapering walls, if desired. It is nested at 12b in the well of the locating plate 12a, see Fig. 3. Main mold 12 has the chamber 16 and its upper face is provided with a suitable number of locating openings 16a. The table 11 is rotated by any suitable means, such as a Geneva movement and the like, not shown, and eight stations are usually provided.

In Fig. 1, the station indicated by the letter A is the glass receiving station. The station B immediately to the left thereof is the pressing station. For clearness, the mold 12, plate 12a, etc. shown in Fig. 3 and partially illustrated in Fig. 1, are omitted from all other portions of the table 11. It is, however, to be understood that eight molds 12 will be provided. It is also to be understood that the direction of rotation of the table 11 is counter-clockwise as indicated by the arrow in Fig. 1.

The glass is deposited in the well portion 16 of the mold portion 12 at the station A and this glass is of measured amount. It may be deposited by hand or automatically, as desired, and since such methods of application are well known in the industry, a disclosure of such mechanism is omitted.

At the station B, during the dwell interval of the table, a plunger is lowered and forces the glass previously deposited in the well 16 into article formation, as indicated by the numeral 17 in Fig. 3. Before the table further rotates, the plunger is elevated so that it sufficiently clears the top of the mold 12 and the article formed therein. This elevational movement of the pressing plunger may continue to the elevation desired. This plunger, if necessary, may be wiped off and/or cooled while so elevating and previous to the registration at station B of another mold 12 therebeneath containing a mass of glass.

As soon as the table travel ceases, the pressing plunger (not shown), is automatically lowered for pressing the glass mass in the mold 12 into article formation and this is repeated at each dwell period at station B in the rotation of the table. The mold 12 on the table after having the article formed therein at station B moves to station C, and successive stations, as well understood in this art. The foregoing constitutes the usual glass pressing practice.

The present invention includes parting the usual mold into the main mold 12 and the rim forming mold 18. At station B the rim 18 mold is lowered into registration with the main mold previous to the pressing operation by the plunger (not shown) which, of necessity, passes through the rim mold 18 and into the cavity 16 of the mold 12. The glass is thereupon forced or pressed into proper formation. The plunger is then elevated, which may continue while the table rotates from station B to C, the table movement, however, not starting until the plunger has sufficiently elevated to clear the rim mold 18.

When the table again rotates, this mold 12 and glass article 17 together with the rim mold 18 rotate as a unit toward station C. Previous to the table attaining the station C position and immediately upon the rim mold 18 being sufficiently elevated so as to clear the mold 12 and article 17, it is quickly repositioned by being returned to the dotted line position illustrated in Fig. 1 but in elevated relation with reference to its mold engaging position therein. When the following mold 12, previously charged at station A, has reached station B by reason of table travel and the dwell period occurs, the rim mold 18 is again lowered into mold engagement, the plunger lowered, the glass mass pressed, the plunger elevated and the cycle then is repeated for the next article.

The molded article 17 in the mold at, or previous to arrival at station C, has been separated from the rim mold 18 and its cooling operation for rim setting. It then moves to station D which is an idle station. Continued rotation of the table then moves the mold and glass article to station E. This is the unloading or transfer station.

The next two stations to the right of station E in the counter-clockwise rotation of table 11, are idle stations and during table travel the mold 12 is inspected and cleaned or otherwise operated upon as may be necessary or desirable preliminary to receiving the measured amount of glass at station A which is immediately to the right of station B, the pressing station.

From the foregoing it will be understood that there are three critical periods or time intervals. The first is the time necessary for the rim mold to register with the main mold and the pressing plunger to move down and perform its pressing operation, and then elevate sufficiently to clear the mold arrangement and the article formed therein. The second critical time interval is that time required for the rim mold to lift or be elevated from the main mold and glass article therein, and be returned to the original or starting position for registration with the succeeding main mold at the pressing station. This interval is critical because the purpose of this portion of the invention is to insure controlled rim cooling. It, of course, is understood that following the pressing operation, the glass while being initially formed from a plastic condition into a condition between that that might be termed semi-plastic and set position, is still quite hot and the rim portion cools first. However, the mold in which the glass article is positioned is warm and the glass itself is warm. Therefore, there is a tendency for this rim to collapse.

This portion of the invention, therefore, is directed to the rim mold maintaining the rim of the article until it has sufficiently cooled but is not over-cooled. This is regulated by the distance the rim mold travels from station B toward station C before the rim mold is elevated.

The third critical time interval is that which is necessary to engage the glass article 17 and remove it from the mold 12. If this be done automatically, this article removing mechanism must be repositioned, ready to engage the next glass article in the succeeding mold 12 when same is in registration with station E.

The longest necessary time interval, of course, will determine the longest dwell period required and this will be common for all stations. Usually this necessary time interval is that required for the pressing operation and, therefore, the invention disclosed herein and associated with the mold and article does not interfere with the normal operation of a standard molding machine, to which the invention has been applied, it being understood that standard practice includes depositing a measured amount of glass in the mold, pressing the same and then removing the article from the mold.

This may be done by removing the mold 12 at station D with the glass article therein and then replacing the mold at station E or a succeeding station previous to the station immediately to the right of station A, station A being the charging station. This is necessary so that the mold be reapplied to the table, if that be the type of operation, previous to that portion of the table from which the mold has been removed arriving at the charging station A.

Reference will now be had more particularly to the rim mold 18 and its associated mechanism illustrated more particularly in Figs. 1 to 3, inclusive. Suitably secured to the base 10, see Figs. 1 and 2, is a plurality of supports 20 to each of which is secured, as at 22, a standard 21 terminating in an offset portion 23 and an elongated bearing portion 24. Rotatably mounted in the pair of bearing portions 24 is the shaft 25.

Pinned or otherwise secured as at 26 to said shaft 25 is a plurality of arms 27, each terminating in the arcuate supporting face 28. A plate structure or trackway 29 bears upon portions 28 and suitably secured to the underface of said track structure as at 30 are the stems 31, the same being slidably supported in the guide portions 32 of the support portions 20—see Fig. 2.

An arm 33 is pinned to the shaft 25 as at 34 and is suitably connected to the upper end 35 of the piston rod 36 which extends into a cylinder 37 suitably supported by the bracket 38 carried by the base 10. Conduit means 40, through valves controlled at a central control station common to machines of this general character and in timed relation with the general operating time cycle of the machine, are arranged to supply pressure fluid to actuate the piston in the cylinder 37 for rocking the arm 33 and, therefore, the arms 27 to raise and lower, at predetermined times the track structure 29; compare the full and dotted line positions thereof in Fig. 2.

It will be remembered the table 11, see Fig. 3, is rotatably supported on the base 10 and the shaft or upright 15 is stationary. The collar 41 is also stationary and provides an upper face 42. Encircling said upright 15 is a sleeve arrangement 43, see Figs. 1 and 3. Said sleeve arrangement is capable of rotary movement or rather, as will hereinafter be pointed out, it has oscillatory movement about the axis of the upright 15. The sleeve 43 is suitably provided with adjustable bearing portions 44 which extend downwardly from the sleeve 43 and bear at their lower ends upon the collar face 42. This adjustment is provided so that the rim mold associated mechanism hereinafter to be described will, when in the lowermost position, be substantially parallel to the table 11 and thus permit mold 18 to closely fit the mold 12, as shown in Fig. 3.

A yoke 45 has apertures 46 in the ends thereof which apertures are aligned so that the yoke will pivot on the pivots 47, herein shown in the form of bolts extending into the collar 43. An arm portion 48 is suitably connected to the yoke 45 as at 49. This arm portion detachably supports as at 50 the rim mold 18 having the article rim forming groove 51, the central pressing plunger receiving aperture 52 and a suitable number of locating pins 54, which are adapted to enter the sockets or recesses 16a in the mold 12, all as shown in Fig. 3. The arm 48 is extended as at 55 and rides upon the track 29. It also is provided near its free end with an upstanding member 56, see Fig. 1.

When the mold 18 is in the full line position, as shown in Fig. 3, the track 29 is in the lowered position, as shown by the full lines in Fig. 3. When the rim mold 18 is to be disengaged, it is elevated by elevating the track 29, as previously described, from the full line position, shown in Fig. 3, to the dotted line position thereof.

Reference will now be had to Fig. 1 wherein there is illustrated an angular support member 57 secured to the base 10 as at 58 and having its upstanding portion 59 apertured as at 60. A brace 61 is suitably secured to said upstanding portion 59 as at 62 and to the base 10 as at 63. Suitably secured to the base as at 64 is a support structure 65.

The foregoing support arrangements are adapted to support an elongated cylinder 66. Support 65 is also adapted to support a conduit 67, which communicates as at 68 by means of a valve 69 with the remote end of the cylinder 66. This end of the cylinder is suitably supported by means of the stemmed head structure 70, the threaded stem of which extends through the aperture 60 to receive the adjusting and securing nut 71. A flexible hose 72 communicates with conduit 67. A flexible hose 73, by way of a valve 75, communicates with the opposite end of the cylinder 66 through the head structure 74.

The piston rod 76 slidable in head 74 supports at its exposed end a V-shaped member 77. Interposed between the head 74 and the member 77 is a coil spring 78 which serves as a cushion construction. When the mold 18 with its supporting arm 48 has moved from its dotted line position, as shown in Fig. 1, to the full line position, the power arrangement shown in Fig. 2 is actuated to move the track 29 from the full line position, see Fig. 2, to the dotted line position. This positions the upstanding member 56 on extension 55 of arm 48 within or immediately adjacent the mouth of the groove formed in the V-shaped member 77.

Air is then applied by means of conduit 67 to force the piston in the cylinder toward the pin 56. Said pin, together with the arm 48, and the rim mold 18, are thereupon moved while elevated from the full line position, see Fig. 1, to the dotted line position therein and upon reaching that position, station B, the air supply to line 72 is discontinued by the control at the central control station arrangement, previously described but not shown herein. Air is then supplied under pressure by line 73 so as to immediately retract the V-shaped return mechanism for the dotted line position shown in Fig. 1, to the full line position shown therein so the V-shaped returning member is conditioned for repeat operation.

While the invention has been previously described as effecting the elevation of the track 29, see Fig. 2, immediately previous to the registration of the arm 48 with the station C and the subsequent return of the rim mold 18 from the full line position to the dotted line position, station B, it is to be understood that such elevation of the track and subsequent separation for clearness of the rim mold 18 with respect to the article receiving mold 12 and article 17, may take place immediately upon arrival of the rim mold 18 into the full line position at station C, as shown in Fig. 1 and while the table is stationary.

Too long an interval of rim mold contact with the article results in excessive local chilling of the tray flange rendering same very subject to breakage. Too short an interval of contact results in a tray rim structure that is not much better than that obtainable in the usual present practice.

The proper interval of contact insures proper cooling so that the hot rim will set and hold its shape, yet not be over-cooled rendering it subject to breakage.

This form of the invention permits trays, etc. to be manufactured with relatively wide rims which heretofore has been extremely difficult to accomplish because of conditions inherent in the usual production methods previously employed.

While the invention has been illustrated and described in great detail in the drawings and foregoing description, the same is to be considered as illustrative and not restrictive in character.

Modifications of the invention described herein will readily suggest themselves to persons skilled in this art; all are considered to be within the broad scope of the invention, reference being had to the appended claims.

The invention claimed is:

1. In a sequential plural station, intermittently operable, glass article pressing machine having a plurality of spaced main molds, and a single-rim mold common thereto, the main molds moving successively at least from a pressing station to an unloading station and return, of means for lowering the rim mold into registration with the main mold at the pressing station prior to pressing the article, and elevating the rim mold from that main mold prior to article removal from the main mold, the rim mold while operatively associated with a main mold insuring retention of the molded form of the article, and means for returning in elevated relation the rim mold to the pressing station for rim mold cooling and successive association with succeeding main molds.

2. A glass machine as defined by claim 1, characterized by the returning means being of oscillatable character for reversing the direction of travel of said rim mold to return the latter to register with a main mold at the pressing station.

3. A glass machine as defined by claim 1, characterized by the main molds revolving about a common axis, the rim mold including a radial arm mounted for oscillation about the axis of revolution of the main molds and including a pivotal or hinge arrangement transverse thereto and having an axis intersecting the revolution axis, the means for raising and lowering the rim mold having operative connection with the arm.

4. A glass machine as defined by claim 1, characterized by the main molds revolving about a common axis, the rim mold including a radial arm mounted for oscillation about the axis of revolution of the main molds and including a pivotal or hinge arrangement transverse thereto and having an axis intersecting the revolution axis, the means for raising and lowering the rim mold including an arcuate track having vertical movement and said arm at its outer end bearing on said track.

5. A glass machine as defined by claim 1, characterized by the rim mold returning means including an extensible cylinder and piston structure operative upon rim mold elevation to rapidly return the rim mold to the pressing station by rapid extension of the structure and while the rim mold is elevated.

6. A glass machine as defined by claim 1, characterized by the main molds revolving about a common axis, the rim mold including a radial arm mounted for oscillation about the axis of revolution of the main molds and including a pivotal or hinge arrangement transverse thereto and having an axis intersecting the revolution axis, the means for raising and lowering the rim mold having operative connection with the arm, an extensible cylinder and piston structure operative upon rim mold arm and elevation thereof to rapidly return the rim mold to the pressing station by rapid extension of the structure and while the rim mold is elevated.

7. A glass machine as defined by claim 1, characterized by the main molds revolving about a common axis the rim mold including a radial arm mounted for oscillation about the axis of rotation of the main molds and including a pivotal or hinge arrangement transverse thereto and having an axis intersecting the revolution axis, the means for raising and lowering the rim mold including an arcuate track having vertical movement and said arm at its outer end bearing on said track, an extensible cylinder and piston structure operative upon rim mold arm and elevation thereof to rapidly return the rim mold to the pressing station by rapid extension of the structure and while the rim mold is elevated.

JAMES A. LEWIS.